Sept. 14, 1937.  F. STEBLER  2,092,938
APPARATUS FOR STERILIZING AND CLEANING BOXES AND CRATES
Filed June 12, 1934  2 Sheets-Sheet 1
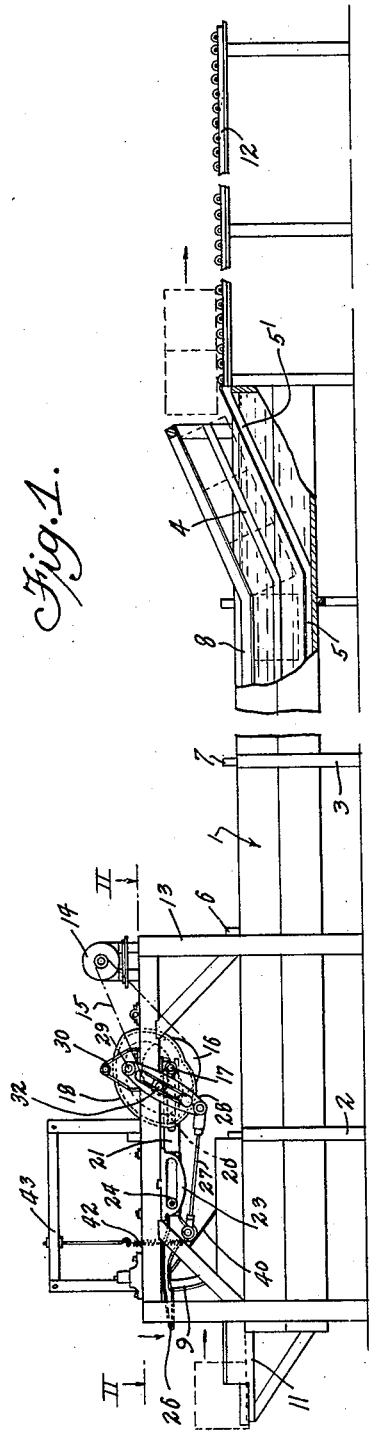
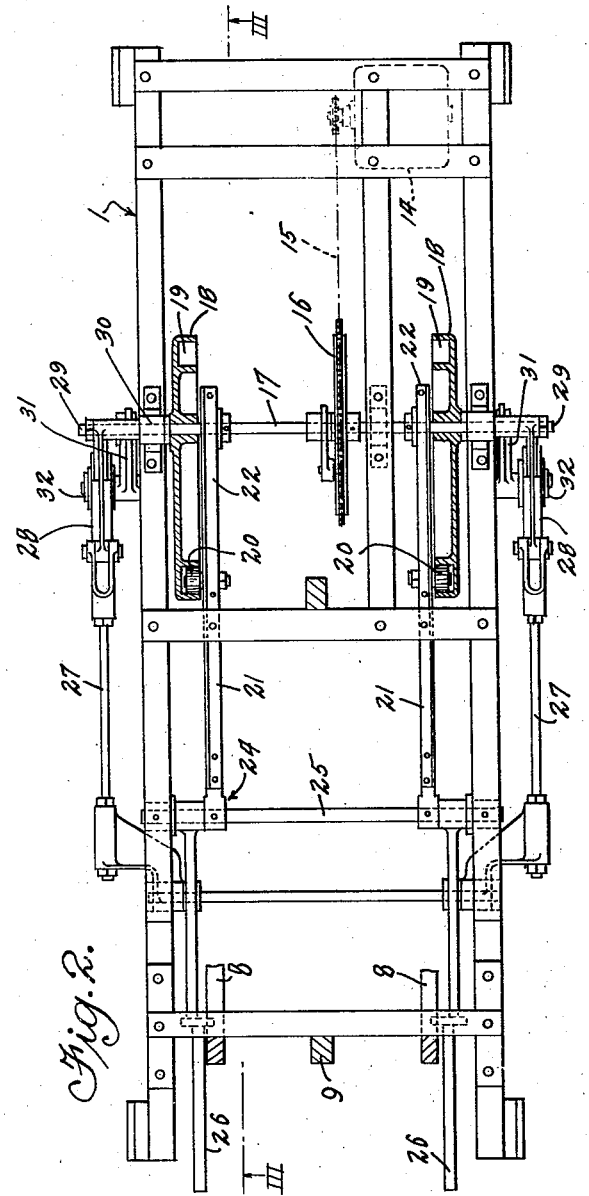
Inventor
Fred Stebler
By Lyon & Lyon
Attorneys Patented Sept. 14, 1937

2,092,938

UNITED STATES PATENT OFFICE 2,092,938

APPARATUS FOR STERILIZING AND CLEANING BOXES AND CRATES

Fred Stebler, Riverside, Calif., assignor to Food Machinery Corporation, San Jose, Calif., a corporation of Delaware Application June 12, 1934, Serial No. 730,273

9 Claims. (Cl. 214—17)

This invention also relates to an apparatus particularly designed for the purpose of subjecting boxes, crates, and other containers to the action of a cleaning and/or sterilizing solution whereby such containers may be washed and sterilized in a rapid and economical manner.

Containers used for the transport or storage of fruits and vegetables become soiled very quickly. The foreign matter is not limited to inorganic dirt but instead comprises organic substances such as portions of the fruits and vegetables, particularly those portions which have been affected by molds, decay, fungi, etc. The stains thus produced on the containers (which are generally of wood) form fertile media for the growth and development of fungi, molds, etc., and as a result, the containers rapidly become unsightly, unsanitary and distributors of bacteriological and fungicidal decay to fruit which is placed into the containers in a sound condition. This invention is primarily directed toward an apparatus which is capable of converting the stained, soiled and unsanitary containers into clean and sterilized containers suitable for further use in the storage and/or transportation of fruits and vegetables.

The apparatus of this invention provides means for submerging empty containers of the character described in a bath of cleaning and sterilizing agent and intermittently moving the containers through such bath, whereby such intermittent motion agitates the bath and insures a thorough removal of the various strains, impurities, etc., from the boxes or containers. The device of this invention includes a longitudinal tank provided with a feed end and a discharge end and with guiding and restraining means positioned near the top of the tank but extending to below the upper edges of the tank so that containers fed into the tank will float against such guiding and restraining means in a submerged position. The apparatus also includes means for intermittently feeding boxes into the tank into position beneath the longitudinally extending guides and to move the boxes thus fed longitudinally along such tank. The containers or boxes are preferably moved along the tank intermittently a distance equivalent to the width of each box at a time.

An object of this invention, therefore, is to disclose and provide an apparatus for efficiently and quickly cleaning and sterilizing containers adapted for use in the transportation and storage of fruits and vegetables.

Another object of this invention is to disclose and provide a combination of elements whereby containers may be automatically moved through and discharged from a washing and sterilizing bath.

These and other objects, uses, adaptations and advantages of the invention will become apparent to those skilled in the art from the following detailed description of a preferred form of apparatus particularly adapted for the efficient operation of the method.

In describing the invention, reference will be had to the appended drawings, in which Fig. 1 is a side elevation, partly broken away, of the apparatus.

Fig. 2 is a plan view, partly in horizontal section, the section being taken along the plane II—II indicated in Fig. 1.

Figure 3:
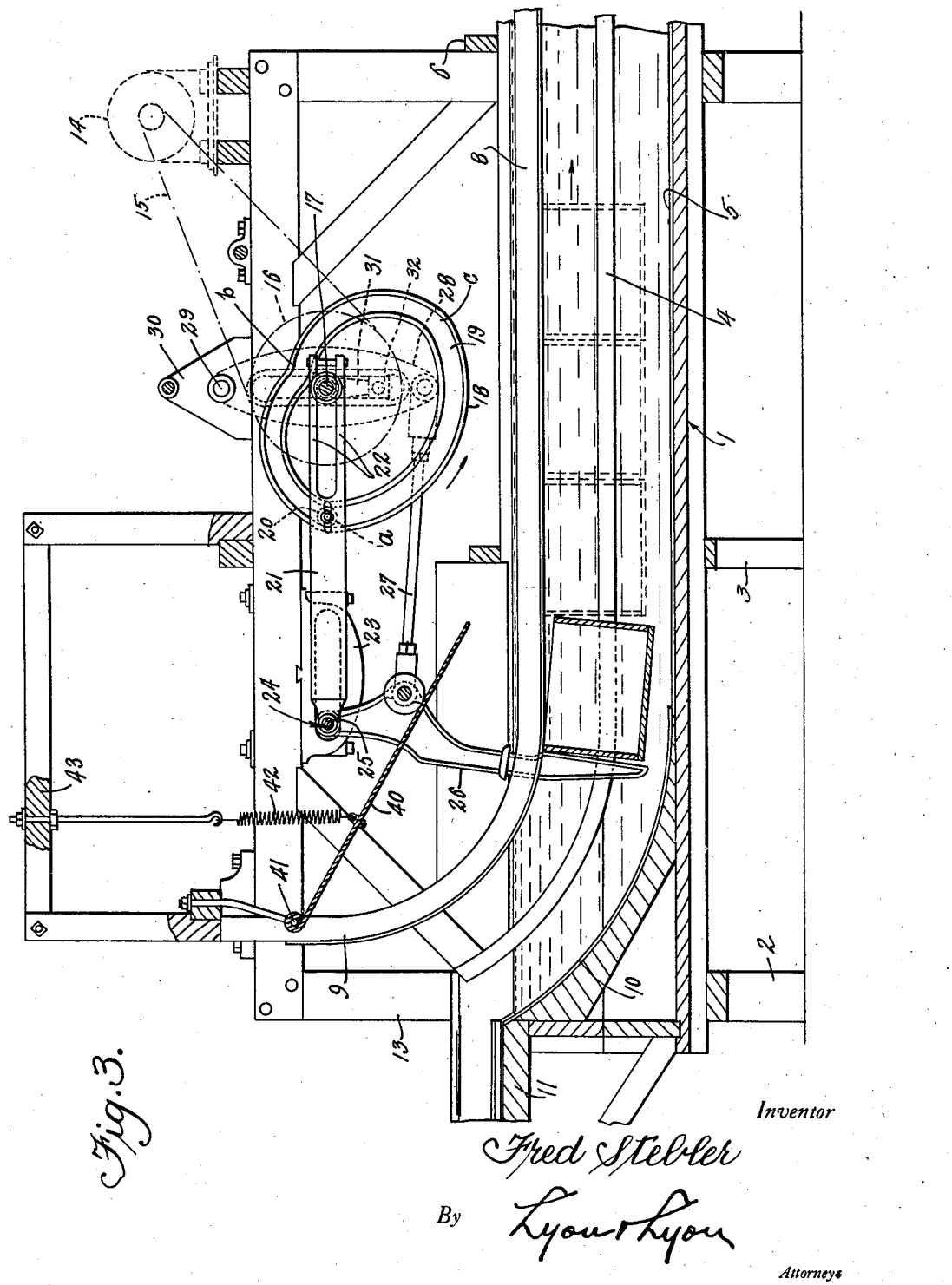
Fig. 3 is a vertical section taken along the plane III—III of Fig. 2.

As shown in Fig. 1, the apparatus comprises an elongated tank generally indicated by the numeral 1. This tank may be made of any suitable non-corrosive material. A wooden tank has been found satisfactory when the washing and sterilizing solution was of the hypochlorite type. This tank may be mounted on suitable supports, 2, 3, etc., and may be provided with longitudinally extending guides fastened to the bottom and sides of the tank. A side guide is indicated at 4 and a bottom guide is indicated at 5. Additional guiding and restraining means are carried suspended from transverse braces 6, 7, etc. These top guides or guiding rails 8 are spaced from the sides of the tank and extend to a plane below the top or upper edge of the tank 1. All of the guides, such as the guides 4, 5, and 8, are made of a non-corrosive material such as brass, hard rubber, phenol condensation products, etc. The internal surfaces of the tank can also be lined with an anti-corrosive mat, such as a hard bitumen, bituminous composition, or the like.

The tank 1 is provided with a feed end and with a discharge end. The upper guiding and restraining rails 8, for example, may curve upwardly as indicated at 9. The bottom of the tank 1 near the feed end may also be curved upwardly, as indicated at 10, to a point above the liquid level within the tank 1. The feed end of the tank may be provided with a shelf or platform 11. The discharge end of the tank 1 may include upwardly inclined bottom rail portions 5' (Fig. 1) leading to a suitable conveyor such as the roller conveyor 12.

Means are provided for feeding the boxes, crates or other containers into the tank and beneath the longitudinally extending guiding and restraining means 8. Such means may be carried upon a frame portion 13 and may comprise a motor or other source of power 14 operatively coupled as by means of a belt 15 and pulley 16 to a driving shaft 17.

The shaft 17 carries two positive action cams 18 of approximately kidney shape. The groove or runway 19 of the cams engages a roller 20 attached to a link 21. The link 21 is provided with a bifurcated end, indicated at 22, adapted to straddle the shaft 17. The other end of the link 21 is attached to a crosshead slidably mounted within the crosshead guide 23 which is carried by a horizontal member of the frame 13. The length of the crosshead guide 23 and the travel of the crosshead 24 within said guide is approximately equal to or slightly greater than the width of a container or box fed into the machine.

It is to be understood that the link 21 is actually connected to a shaft 25 which is in turn journaled in the crosshead 24. The shaft 25 also carries arms 26 which are adapted to extend beyond the guides 8 and the upwardly curving portions 9 thereof. The arms 26 are pivotally connected by means of a rod 27 with the end of a slotted rocker 28. The rocker itself is pivoted by means of a pin 29 supported by a hanger 30. The shaft 17 carries at its end cranks 31 provided with crossheads 32 which are slidably mounted in the slots of the rockers 28.

The rotation of the shaft 17 will thus actuate the crank 31 which will cause a pivotal motion of the slotted rocker 28. As the end of the rocker 28 is attached by means of the rod 27 to the arm 26, the arm 26 will be caused to pivot on the shaft 25. The downward movement of the arm 26 from the position indicated in Fig. 1 is relatively slow, being caused by a rotation of approximately 300° of the shaft 17 whereas the return to original position is accomplished in the time consumed by the residual 60° rotation of the shaft 17.

The ultimate motion of the arm 26 is not a simple pivotal motion about a stationary point or shaft 25. Instead, the arm 26 pivots downwardly from the position indicated in Fig. 1 to the position indicated in Fig. 3 and thereafter the arm 26 moves toward the right while maintaining a substantially vertical position. The substantially vertical movement toward the right is caused by the fact that the cam 18 moves the shaft 25 and the crosshead 24 horizontally within the slotted guide 23. When the roller 20 affixed to the link 21 is traveling in that portion of the cam slot 19 between points $a$ and $b$ (Fig. 3), the difference in throw of the cam 18 between points $a$ and $b$ is substantially equivalent to the length of the crosshead guide 23.

While the crank 31 is pulling the arm 26 down into the tank 1 (from the position shown in Fig. 1 to the position shown in Fig. 3), the roller 20 rides in that portion of the cam groove embraced between the points $a$ and $c$. This portion of the cam groove is circular and equidistant from the axis of rotation of the cam so that the link 21 does not move during such preliminary movement of the arm 26.

Attention is called to the fact that when the arm 26 moves downwardly into the tank 1 and then moves horizontally along the length of the tank, such movement is relatively slow. On the return stroke, the movement is rapid. In this manner boxes fed under the arm 26 are not struck a quick blow by the arm 26 but instead are gently but firmly forced between the bottom guide 10 and the upwardly curved guide portion 9. Undue splashing of washing and sterilizing solution is prevented. The movement of the arm 26, while it is in a substantially vertical position, longitudinally of the tank 1, should be approximately equal in length to the width, or other dimensions, of the containers, boxes or crates handled by the machine. As the boxes are generally made of wood, they will float up against the top rail 8 and the arm 26 should overcome the frictional resistance of all of the boxes in the tank against such guide.

In order to prevent undue splashing, a splash plate 40 is pivotally connected to the front of the machine as, for example, at 41, such splash plate extending beneath the guide 23 and rod 27. The plate 40 may be upwardly reached by means of a spring 42 connected to a portion of the frame 43.

In actual operation, the tank 1 is filled with a suitable cleaning and sterilizing solution, such as a solution of sodium or calcium hypochlorite. Cleaning and sterilizing solutions of the character described in a co-pending application Serial No. 727,982 filed by Jagan N. Sharma are eminently suited. When the treating solution contains available chlorine (as disclosed in the aforesaid Sharma application), the crates or boxes become impregnated with the treating solution to such an extent that chlorine is gradually given off during subsequent use of the boxes for transportation or storage of fruit, such chlorine thereby acting as a mold and decay-retarding agent. The intermittent movement of the boxes throughout the tank ordinarily creates a sufficient amount of surging and agitation to thoroughly cleanse the boxes of all organic and foreign matter so that the boxes discharged along the incline 5' are perfectly clean, bright and sterilized. Recirculation of the treating solution and the injection thereof into the tank by means of jets may be used but is not necessary.

Although a particular form of apparatus has been described in detail, it is to be understood that numerous changes and modifications may be made therein without departing from the scope of the invention. In the event it is desired to operate two of the machines simultaneously from the same motor means, the cams 18 on the adjoining machine may be set at 180° to the cams on the other machine so that the arms 26 of the adjoining machines operate alternately, permitting one operator to feed boxes or crates to both machines.

All such changes and modifications as come within the scope of the appended claims are embraced thereby.

I claim:
1. In an apparatus of the character described including a tank provided with a feed end and a discharge end, the combination of: longitudinally extending guiding and restraining means positioned near the top of said tank and extending to below the upper edges of said tank; and means for intermittently feeding containers into said tank beneath said longitudinally extending means and for moving each container thus fed longitudinally of the tank for a fractional length of the tank, said means including downwardly curving bottom guides at the feed end of the tank, an arm pivotally mounted at said feed end for movement into and out of said tank in operative relation to said downwardly curving guides, means for oscillating said arm on its pivot, and means for reciprocatingly moving said pivot and arm when said arm is in said tank.

2. In a device of the character described including a tank provided with a feed end and a discharge end, the combination of: longitudinally extending guides positioned near the top but extending to below the upper edges of said tank; a frame extending above said tank adjacent the feed end thereof, a crosshead guide carried by said frame, an arm arranged to pivotally and slidably move within said crosshead guide, crank means for pivoting said arm into and out of said tank, and cam means for moving said arm in a substantially vertical position.

3. In a device of the character described including a tank provided with a feed end and a discharge end, the combination of: longitudinally extending guides positioned near the top but extending to below the upper edges of said tank, said guides being upwardly curved at the feed end of said tank; a frame extending above said tank adjacent the feed end thereof, a crosshead guide carried by said frame, an arm arranged to pivotally and slidably move within said crosshead guide, crank means for pivoting said arm into and out of said tank, and cam means for moving said arm within said crosshead guide in a substantially vertical position when said arm is in the tank.

4. In a device of the character described including a tank provided with a feed end and a discharge end, the combination of: longitudinally extending guides positioned near the top but extending to below the upper edges of said tank; a frame extending above said tank adjacent the feed end thereof, a crosshead guide carried by said frame, an arm arranged to pivotally and slidably move within said crosshead guide, a driven shaft carried by the frame, a slotted rocker pivotally connected to said frame at one end, a rod connecting the other end of said rocker with said arm, a crank mounted on said shaft and in operative engagement with the slot of said rocker whereby said arm may be moved into and out of said tank, and cam means mounted on said shaft and operatively connected to said arm for moving said arm in a substantially vertical position when said arm is within said tank.

5. In an apparatus of the character described including a tank provided with a feed end and a discharge end, the combination of: longitudinally extending guiding and restraining means positioned near the top of said tank but extending to below the upper edges of said tank, and means for intermittently feeding boxes into said tank into position beneath said longitudinally extending guiding and restraining means and to move each box thus fed longitudinally within said tank during each intermittent feeding operation, said means including an arm pivotally mounted for movement into and out of said tank, means for slowly pivoting said arm, means for moving said arm longitudinally of the tank while maintaining the arm in substantially vertical position, and quick-acting means for returning the arm to its original position.

6. An apparatus for intermittently feeding loose boxes into a tank adapted to receive a cleansing fluid and provided with a feed end and a discharge end, comprising: a substantially horizontal crosshead guide positioned above the feed end of said tank, and an arm pivotally connected to the crosshead within said crosshead guide, means for moving said crosshead within said guide, and means actuated in timed relation to the means for moving said crosshead for pivoting said arm into and out of said tank, whereby said arm is moved in said tank in a horizontal direction while said arm is in a substantially vertical position.

7. An apparatus for intermittently feeding containers into a tank adapted to receive a cleansing fluid and provided with a feed end and a discharge end, comprising: a horizontally disposed crosshead guide above a tank, a crosshead slidably mounted in said guide, arms pivotally connected to the crosshead and adapted to move into and out of said tank, a drive shaft, a rocker arm, means operably connecting the drive shaft and rocker arm to oscillate the latter, link means connecting said rocker and arms to pivot the latter into and out of said tank, and means actuated by the drive shaft to reciprocatingly move said crosshead while said arms are in said tank.

8. An apparatus for intermittently feeding containers into a tank adapted to receive a cleansing fluid and provided with a feed end and a discharge end, comprising: a horizontally disposed crosshead guide above a tank, a crosshead slidably mounted in said guide, arms pivotally connected to the crosshead and adapted to move into and out of said tank, a drive shaft, a rocker arm, means operably connecting the drive shaft and rocker arm to oscillate the latter, link means connecting said rocker and arms to pivot the latter into and out of said tank, and kidney-shaped cams driven by said shaft and operably connected to said crosshead for reciprocatingly moving said crosshead while said arms are in said tank.

9. An apparatus for intermittently feeding containers into a tank adapted to receive a cleansing fluid and provided with a feed end and a discharge end, comprising: longitudinally extending guides positioned near the top but extending to below the upper edges of said tank, said guides being upwardly curved at the feed end of said tank, a crosshead guide horizontally positioned above said tank and extending in the longitudinal direction of said tank, a crosshead slidably mounted in said guide, a drive shaft, a rocker arm, means operably connecting the drive shaft and rocker arm to oscillate the latter, link means connecting said rocker and arms to pivot the latter into and out of said tank, cam means carried by said drive shaft, bifurcated links pivotally connected to said crosshead, the bifurcated ends thereof encircling said drive shaft, and means operably connecting said cams and links whereby said crosshead and arms are reciprocatingly moved while said arms are in the tank.

FRED STEBLER.